United States Patent [19]

Bearden, Jr. et al.

[11] 4,067,799
[45] Jan. 10, 1978

[54] HYDROCONVERSION PROCESS

[75] Inventors: Roby Bearden, Jr.; Clyde L. Aldridge, both of Baton Rouge, La.

[73] Assignee: Exxon Research and Engineering Company, Linden, N.J.

[21] Appl. No.: 702,238

[22] Filed: July 2, 1976

[51] Int. Cl.² ................ C10G 13/06; B01J 27/04
[52] U.S. Cl. .................................. 208/112; 208/207; 208/215; 208/217; 252/439; 252/472; 252/473; 252/477 R
[58] Field of Search ............... 208/112, 206, 207, 208, 208/215

[56] References Cited

U.S. PATENT DOCUMENTS

| 1,940,652 | 12/1933 | Semmes | 208/112 |
|---|---|---|---|
| 3,161,585 | 12/1964 | Gleim et al. | 208/264 |
| 3,297,563 | 1/1967 | Doumani | 208/59 |
| 3,502,571 | 3/1970 | Stolfa | 208/108 |
| 3,622,495 | 11/1971 | Gatsis et al. | 208/59 |

Primary Examiner—Delbert E. Gantz
Assistant Examiner—G. E. Schmitkons
Attorney, Agent, or Firm—Marthe L. Gibbons; Maethe L. Gibbons

[57] ABSTRACT

A heavy hydrocarbonaceous oil is converted to lower boiling hydrocarbon products by treatment with hydrogen in the presence of a catalyst comprising a metal phthalocyanine and a particulate iron component.

20 Claims, 2 Drawing Figures

HYDROCONVERSION PROCESS

BACKGROUND OF THE INVENTION

1. Field of the Invention

The present invention relates to a process for the conversion of heavy hydrocarbons to lower boiling hydrocarbon products. More particularly, it relates to a hydroconversion process in which a heavy hydrocarbonaceous feed is reacted with hydrogen in the presence of a metal phthalocyanine in combination with an added particulate iron component.

2. Description of the Prior Art

The hydrocracking process is well known in the art. In a hydrocracking process, a hydrocarbonaceous feed is cracked and hydrogenated to yield more valuable lower molecular weight hydrocarbon products. Typical operating conditions for catalytic hydrocracking include a temperature between 500° and 1000° F., a pressure between 100 and 10,000 pounds per square inch gauge (psig), a hydrogen rate between 100 and 10,000 standard cubic feet per barrel of oil feed and the use of a catalyst containing a metal hydrogenation component, typically a metal component of Group VIB and/or Group VIII of the Periodic Table of Elements. The Periodic Table referred to herein is in accordance with the *Handbook of Chemistry and Physics*, published by the Chemical Rubber Publishing Company, Cleveland, Ohio, 45th Edition (1964).

U.S. Pat. No. 3,502,571 discloses a process for hydrocracking a hydrocarbonaceous black oil utilizing a metal phthalocyanine catalyst.

It has now been found that coke formation in a metal phthalocyanine catalyzed hydroconversion of heavy hydrocarbonaceous feeds can be minimized when the metal phthalocyanine is used in combination with an added finely dispersed particulate iron component.

The term "hydroconversion" is used herein to designate a catalytic process conducted in the presence of hydrogen in which at least a portion of the heavy constituents and coke precursors (as measured by Conradson carbon residue) of the hydrocarbonaceous oil are converted to lower boiling hydrocarbon products while simultaneously reducing the concentration of nitrogenous compounds, sulfur compounds, and metallic contaminants.

SUMMARY OF THE INVENTION

In accordance with the invention, there is provided in a process for the hydroconversion of a heavy hydrocarbonaceous oil by contacting said oil under hydroconversion conditions with hydrogen and a catalyst comprising a metal phthalocyanine in a reaction zone, the improvement which comprises hydroconverting said heavy oil in the presence of an effective amount of dispersed iron component particles added to said reaction zone, said iron component being selected from the group consisting of elemental iron, iron oxides, iron sulfides, and mixtures thereof.

DESCRIPTION OF THE PREFERRED EMBODIMENT

Figure 1:
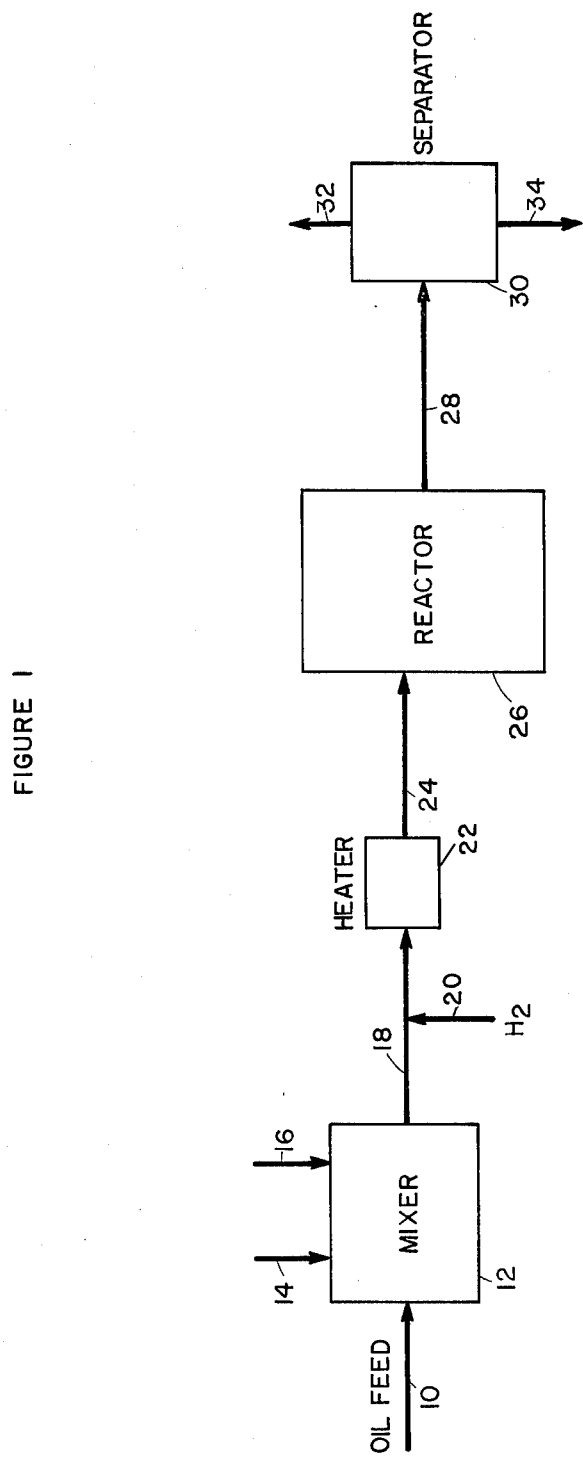
FIG. 1 is a schematic flow plan of one embodiment of the invention.

Referring to FIG. 1, a heavy hydrocarbonaceous oil feed is introduced by line 10 into mixer 12. Suitable heavy hydrocarbonaceous oil feeds include heavy mineral oils; petroleum crude oils, including heavy crude oils; reduced crude petroleum oils; residual oils such as petroleum atmospheric or vacuum distillation tower bottoms products; tars; bitumen; tar sand oils; shale oil; liquid products derived from coal liquefaction products; and mixtures thereof. The hydrocarbonaceous feed utilized in the process of the present invention may contain up to about 8 weight percent sulfur contaminants and up to about 2000 or more weight parts per million metallic contaminants (nickel, iron, vanadium, etc.). The Conradson carbon residue of such feeds will generally range from about 4 to about 50 weight percent (as to Conradson carbon, see ASTM D189-65). An iron component is introduced into mixer 12 via line 14. The iron component is selected from the group consisting of elemental iron, iron oxides and iron sulfides. Desirably, the catalyst will be in finely divided particulate form. The iron component (calculated as the metal) is added to the hydrocarbonaceous feed in an amount ranging from about 0.1 to about 30 weight percent calculated as the elemental metal based on the hydrocarbonaceous feed, preferably from about 1 to about 10 weight percent. It should be understood that the given amount of iron component refers to amounts which are added to the feed in excess of the iron that may be present as metallic contaminant in the hydrocarbonaceous feed. A metal phthalocyanine catalytic agent is introduced into mixer 12 via line 16. As shown in "Phthalocyanine Compounds," Moser and Thomas, Rheinhold Publishing Company, page 105, 1963, metallic phthalocyanine derivatives are known for the eight groups of the Periodic Table of Elements. The preferred metal phthalocyanine derivatives are those containing barium, titanium, tin, hafnium, vanadium, antimony, chromium, molybdenum, cobalt, nickel, palladium, platinum, and mixtures of two or more. The more preferred phthalocyanine derivatives are those containing cobalt, vanadium, nickel, chromium, molybdenum, platinum and mixtures thereof. The most preferred phthalocyanine derivatives are those containing cobalt or nickel. The metallic phthalocyanine derivative is mixed with the heavy hydrocarbonaceous oil feed in amounts ranging from about 50 weight parts per million to 2 percent by weight of said heavy oil, calculated as the elemental metal, preferably from about 100 weight parts per million to about 1 weight percent, more preferably from about 200 to about 2000 weight parts per million. The heavy oil-iron component-metal phthalocyanine mixture is removed from mixer 12 via line 18. It should be noted that instead of introducing the metal phthalocyanine into the mixer, it could be introduced into line 18. In the process of the present invention, the metal phthalocyanine in combination with the particulate iron component constitute the catalyst. Hydrogen is introduced into the oil-catalyst mixture via line 20. The oil-catalyst-hydrogen mixture is then passed to a heater 22 where the mixture is preheated. The preheated mixture is removed via line 24 and passed to a reactor 26. The hydroconversion reaction zone in reactor 26 is maintained at a temperature ranging from about 343° to 538° C. (650° to 1000° F.), preferably from about 426° to 482° C. (799° to 900° F.), more preferably from about 400° to 468° C. (824° to 875° F.) and at a hydrogen partial pressure ranging from about 500 to about 5000 psig, preferably from about 1000 to about 3000 psig.

The space velocity defined as volumes of oil feed per hour per volume of reactor (V/hr./V) may vary widely depending on the desired conversion level. Suitable space velocity may range broadly from about 0.1 to 10 volumes of oil feed per hour per volume of reactor, preferably from about 0.25 to 6 V/hr./V, more preferably from about 0.5 to 2 Vhr./V. Suitable hydrogen feed rates include from about 2000 to about 20,000 standard cubic feet of hydrogen per barrel of hydrocarbon oil feed, preferably 4000 to 8000 SCF/B. The mixed phase product effluent of the hydroconversion reaction zone is removed from reactor 26 via line 28 and passed to a separator 30 wherein it is separated by conventional means into a predominately vaporous phase comprising light normally gaseous hydrocarbons and hydrogen removed via line 32 and a principally liquid phase removed via line 34. The vaporous phase may be further separated by conventional means to obtain a hydrogen-rich gas which, if desired, may be recycled to the hydroconversion process. The normally liquid hydrocarbon phase removed via line 34 may be separated into fractions as is well known in the art. For example, the normally liquid hydrocarbon phase may be separated into a naphtha stream, a middle distillate stream and a residuum fraction containing the metal phthalocyanine and the particulate iron component. If desired, part or all of the residuum fraction containing the catalyst may be recycled to the hydroconversion process to provide additional catalyst.

Optionally, the residual catalyst-containing stream can be burned to provide process heat or gasified to provide process hydrogen, thereby giving rise to a catalyst ash that can be recovered and recycled to the process. Furthermore, it is also possible to separate catalyst from the reactor effluent or from a concentrated product residual stream by any conventional means known to the art, i.e., filtration, centrifugation, settling and drawoff. A particularly suitable separation comprises a magnetic filtration of the iron-containing catalyst. If desired, at least a portion of the separated catalyst can be recycled directly to the process or the separated catalyst may be burned to remove carbon therefrom prior to recycle.

The following examples are presented to illustrate the invention.

The inspection of the oil feedstocks utilized in the following examples is summarized in Table I.

The catalysts and catalyst preparation utilized in the examples are summarized in Table II.

TABLE I

| FEEDSTOCK INSPECTIONS | | |
|---|---|---|
| Feed Designation | Jobo | Safaniya Vac. Resid. |
| Feedstock No. | 1 | 2 |
| API Gravity | 8.5 | 4.6 |
| Sulfur, Wt. % | 3.8 | 5.2 |
| Nitrogen, Wt. % | 0.7 | 0.4 |
| Carbon, Wt. % | 83.92 | 83.55 |
| Hydrogen, Wt. % | 10.49 | 10.00 |
| Oxygen, Wt. % | 0.57 | — |
| Conradson Carbon, Wt. % | 13.8 | 23.7 |
| Metals, ppm | | |
| Ni | 97 | 53 |
| V | 459 | 171 |
| Fe | — | 28 |
| Viscosity | | |
| VSF at 122° F. | — | |
| 140° F. | — | |

TABLE I-continued

| FEEDSTOCK INSPECTIONS | | |
|---|---|---|
| 210° F. | 247 | 120 |
| Pour Point, ° F. | | 17.4 |
| Distillation | | |
| IBP, ° F. | 518 | 1049 |
| 5% | 629 | |
| 10% | 682 | |
| 20% | 798 | |
| 30% | 895 | |
| 40% | 978 | |
| 50% | 1037 | |
| 60% | | |
| 70% | | |
| 80% | | |
| 90% | | |
| 95% | | |
| FBP | | |
| % Rec. | 51.8 | |
| % Res. | 48.2 | |

TABLE II

CATALYSTS AND CATALYST PREPARATION

1. Cobalt phthalocyanine and nickel phthalocyanine were purchased from Research Organic/Inorganic Chemical Corporation. The compounds were obtained as powders and were used as is in the examples shown.
2. Iron oxide, $Fe_2O_3$, was purchased from Baker and Adamson as a finely divided powder (reagent grade). Prior to use as a catalyst in the examples shown, the powder was screened through a 200 mesh screen to remove any large lumps and was then prereduced at 450-460° C. for 30 minutes at 2000 + psig hydrogen pressure. The partially reduced powder was cooled and stored under Argon until used.
3. In combination catalyst runs, the prereduced iron oxide and metal phthalocyanine were added separately to the feedstock. There was no premixing step or pretreatment step.

EXAMPLE 1

Experiments were conducted with a Jobo crude oil at 820° F. (437.7° C.) and a hydrogen partial pressure of 2000+ psig for 30 to 35 minutes utilizing as catalyst iron oxide psig for 30 to 35 minutes utilizing as catalyst iron oxide in combination with cobalt phthalocyanine. Results of the runs, designated runs 1 to 4, are summarized in Table III.

TABLE III

IRON OXIDE-COBALT PHTHALOCYANINE CATALYST
820° F., Jobo Crude, 30-35 Min., 2000+ psig $H_2$

| Run | 1 | 2 | 3 | 4 |
|---|---|---|---|---|
| Metals | | | | |
| $Fe_2O_3$, Wt. % on Feed | None | — | 7 | 7 |
| Cobalt, wppm on Feed (Added as Phthalocyanine) | None | 800 | — | 400 |
| $H_2$ Consumed, SCF/B | 198 | 743 | 472 | 707 |
| Coke, Wt. % on Feed | 6.8 | 2.9 | 0.7 | 0.4 |
| $C_1$-$C_4$ Gas, Wt. % on Feed | 4.3 | 2.9 | 2.3 | 2.2 |
| Total Con.[1] Carbon Conv., % | 39 | 59 | 39 | 40 |
| Useful Con. Carbon Conversion, % (excluding conv. to coke) | 0 | 34 | 27 | 37 |

[1]Conradson carbon conversion

Run 1 was the control run of the series. The data resulting from run 1 show very little hydrogenation activity and high losses of feed to coke and light ($C_1$-$C_4$) gas under hydroconversion conditions. With cobalt phthalocyanine present, in run 2, hydrogenation activity was excellent but coke suppression was only moderate relative to control run 1. With iron oxide alone, in run 3, the coke forming reaction is brought under control, but the hydrogenation activity is low and the level of useful Conradson carbon conversion is low relative to the cobalt phthalocyanine run. Run 4 showed that a combination of iron oxide and cobalt phthalocyanine provides the best features of both catalysts, i.e. excellent coke suppression and good hydrogenation activity and an attractive level of Conradson carbon conversion. Coke yield (0.4% on feed) is lower than obtained with iron oxide alone and useful Conradson carbon conversion is higher than obtained either with iron oxide or cobalt phthalocyanine alone.

EXAMPLE 2

Figure 2:
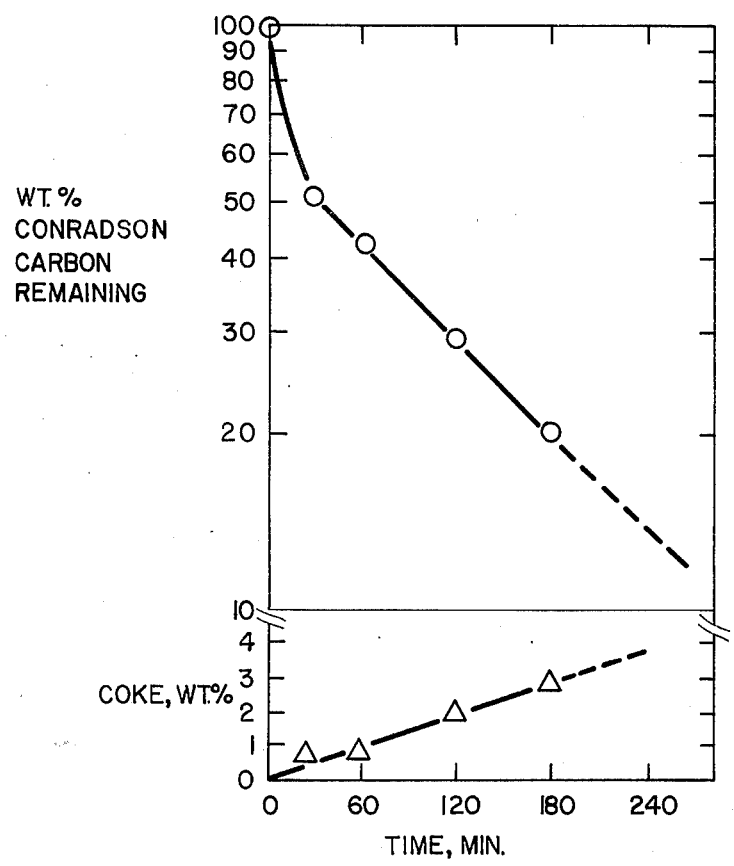
FIG. 2 is a plot of results obtained from hydroconversion experiments.

Experiments were conducted with a Safaniya vacuum residuum at 820° F. (437.7° C.) and at 2000+ psig hydrogen partial pressure utilizing as catalyst iron oxide in combination with cobalt phthalocyanine. The results are summarized graphically in FIG. 2 in which weight percent Conradson carbon remaining and weight percent coke yield are plotted relative to time in minutes. This set of experiments showed the utility of the combination catalyst (iron oxide plus cobalt phthalocyanine) for carrying out the extensive hydroconversion (80+ % Conradson carbon) of a Safaniya vacuum residuum while holding the coke yield to less than 3 weight percent. For comparision, the coke yield obtained without catalyst after 1 hour at the noted conditions was 11.8 percent on feed.

EXAMPLE 3

Experiments were made with a Safaniya vacuum residuum feed at 820° F. (437.7° C.) and at 2000+ psig hydrogen partial pressure for 2 hours utilizing as catalyst nickel phthalocyanine in combination with iron oxide. Results of these experiments are summarized in Table IV.

TABLE IV

Ni-PHTHALOCYANINE + $Fe_2O_3$ VS. Ni-PHTHALO ALONE WITH SAFANIYA VACUUM FEED
820° F., 2000+ psig $H_2$, 2 Hrs.

| Run | 5 | 6 |
|---|---|---|
| wppm Nickel on Feed (as phthalocyanine) | 400 | 400 |
| Wt. % $Fe_2O_3$ on Feed | 18 | 0 |
| $C_1$-$C_4$ Gas, Wt. % | 4.1 | 7.2 |
| Coke, Wt. % | 2.76 | 12.0 |
| Total Conradson carbon conversion, % | 63 | 73 |
| Useful Conradson carbon conversion, % (excludes conv. to coke) | 51 | 22 |

As can be seen from the data in Table IV, a pronounced effect is obtained by combining nickel phthalocyanine with iron oxide. With nickel phthalocyanine alone, in run 6, coke suppression is poor and, although the overall Conradson carbon conversion was 73 percent, when adjusted to exclude conversion to coke, the useful Conradson carbon conversion was only 20%. By contrast, in run 5, the combination of iron oxide with nickel phthalocyanine provided a coke suppression roughly equivalent to cobalt phthalocyanine-iron oxide combination (see FIG. 2) and a useful Conradson carbon conversion of 51%.

What is claimed is:

1. In a process for the hydroconversion of a heavy hydrocarbonaceous oil by contacting said oil under hydroconversion conditions with hydrogen and a catalyst comprising a metal phthalocyanine in a reaction zone, the improvement which comprises hydroconverting said heavy oil in the presence of an effective amount of dispersed iron component particles added to said reaction zone, said iron component being selected from the group consisting of elemental iron, iron oxides, iron sulfides, and mixtures thereof.

2. The process of claim 1 wherein said iron component particles are added to said heavy oil and dispersed therein prior to introducing said heavy oil in said reaction zone.

3. The process of claim 1 wherein said iron component particles are introduced into said reaction zone concurrently with said heavy hydrocarbonaceous oil.

4. The process of claim 1 wherein said reaction zone is maintained at a temperature ranging from about 343° to about 538° C.

5. The process of claim 1 wherein the partial pressure of said hydrogen in said reaction zone ranges from about 500 to about 5000 psig.

6. The process of claim 1 wherein said iron component is added to said reaction zone in an amount ranging from about 0.1 to about 30 weight percent, calculated as the elemental metal based on the heavy oil.

7. The process of claim 1 wherein said iron component is added to said reaction zone in an amount ranging from about 1 to about 10 weight percent, calculated as the elemental metal based on the heavy oil.

8. The process of claim 1 wherein said added iron component comprises elemental iron.

9. The process of claim 1 wherein said added iron component comprises an iron oxide.

10. The process of claim 1 wherein said added iron component comprises an iron sulfide.

11. The process of claim 1 wherein said metal phthalocyanine is present in said reaction zone in an amount ranging from about 50 weight parts per million to about 2 weight percent calculated as the elemental metal based on the heavy oil.

12. The process of claim 1 wherein said metal phthalocyanine is present in said reaction zone in an amount ranging from about 100 weight parts per million to about 1 weight percent calculated as the elemental metal based on the heavy oil.

13. The process of claim 1 wherein said metal phthalocyanine is present in said reaction zone in an amount ranging from about 200 to about 2000 weight parts per million, calculated as the elemental metal based on the heavy oil.

14. The process of claim 1 wherein the metal constituent of said metal phthalocyanine is selected from the group consisting of barium, titanium, tin, hafnium, vanadium, antimony, chromium, molybdenum, cobalt, nickel, palladium, platinum and mixtures thereof.

15. The process of claim 1 wherein the metal of said metal phthalocyanine is selected from the group consisting of cobalt, vanadium, nickel, chromium, molybdenum, platinum and mixtures thereof.

16. The process of claim 1 wherein the metal constituent of said metal phthalocyanine is selected from the group consisting of cobalt and nickel.

17. In a process for the hydroconversion of a heavy hydrocarbonaceous oil under hydroconversion conditions including a temperature ranging from about 343° C. to about 538° C. with hydrogen at a hydrogen partial pressure ranging from about 500 to about 5000 psig in the presence of a catalyst comprising a metal phthalocyanine in a reaction zone, the improvement which comprises hydroconverting said oil in the presence of dispersed iron component particles, said iron component being added to said reaction zone in an amount ranging from about 0.1 to about 30 weight percent, calculated as the elemental metal based on the heavy oil, said iron component being selected from the group consisting of elemental iron, iron oxides, iron sulfides and mixtures thereof.

18. The process of claim 17 wherein said added iron component comprises iron oxide ($Fe_2O_3$).

19. The process of claim 17 wherein said metal phthalocyanine is cobalt phthalocyanine.

20. The process of claim 17 wherein said metal phthalocyanine is nickel phthalocyanine.

* * * * *